United States Patent [19]

Gyr

[11] Patent Number: 5,197,413
[45] Date of Patent: Mar. 30, 1993

[54] TANGLE-LIMITING PET COLLAR

[76] Inventor: Kaj Gyr, 1807 NE. 52nd Ave., Portland, Oreg. 97213

[21] Appl. No.: 604,053

[22] Filed: Oct. 26, 1990

[51] Int. Cl.$^5$ ............................................... A01K 27/00
[52] U.S. Cl. ....................................................... 119/106
[58] Field of Search ................................. 119/106, 109

[56] References Cited

U.S. PATENT DOCUMENTS

| | | | |
|---|---|---|---|
| 2,361,108 | 10/1944 | Johnson | 119/106 |
| 4,328,767 | 5/1982 | Peterson | 119/106 |
| 4,841,915 | 6/1989 | Rocchetti | 119/106 |
| 4,996,948 | 3/1991 | Klein et al. | 119/106 |

FOREIGN PATENT DOCUMENTS 2334289  7/1977  France ............................. 119/106

*Primary Examiner*—John G. Weiss

[57] ABSTRACT

A tangle limiting pet collar of the type comprising a band of material forming a collar (12) which encircles the neck of a pet, a means of leash attachment (10), and a diameter adjustment means (14). A focus of weight which serves to counterbalance the weight at the leash attachment (10) site is set so that it's roughly 180 degrees from the leash attachment (10). This ensures that the leash attachment is maintained in a position on top of the pet's neck, as opposed to drifting down towards the pet's legs, where it has a greater chance of becoming entangled. Such a weight may take a variety of forms, or even simply be the diameter adjuster itself (14). The focus of weight should be equal to or greater than the weight bearing on the collar at the leash attachment (10). The weight can be integral with the collar, or added to conventional collars and choke chains/collars. Either the leash attachment (10), or the diameter adjuster (14) must be adjustable around the perimeter of the collar. This ensures that the focus of weight is always positioned so that it counterbalances the leash attachment, regardless of varying collar diameters. The principle of counterbalancing weights may also be employed in a convertible collar/choke chain, as shown in FIG. 8 and described in claims 8, 9, 19, and 20.

4 Claims, 7 Drawing Sheets

TANGLE-LIMITING PET COLLAR

BACKGROUND

1. Field of Invention

This invention relates to Pet Collars, specifically to such collars which limit entanglement of the leash between the pet's legs.

2. Description of Prior Art

Entanglement of the leash between a pet's legs has been a perennial problem with conventional leash/collar arrangements. The problem begins with standard collars, which allow the leash attachment to drift down toward the bottom of the pet's neck. This position decreases the distance between the pet's legs and the leash, which automatically makes the leash more susceptible to entanglement in the pet's legs. My patent search didn't disclose any collars that were designed with this in mind, which is quite surprising considering how obnoxious this problem can be.

There are numerous types of pet collars on the market, the main difference among them being materials used and means of attachment. In terms of design, there are Choke Chains & Collars, Harnesses, and Conventional Collars.

The so-called "choke chains" (no euphemism there) and choke collars are designed to limit the amount of pull the pet exerts on the leash, but they actually aggravate the problem of leash entanglement due to the leash attachment's tendency to drift down the neck of the pet.

My invention uses counterweight(s), which are affixed to the collar roughly 180 degrees from the leash attachment. Thus the leash attachment has a tendency to stay on top of the collar. Such a situation limits the amount of contact between the leash and the pet's legs, effectively curtailing leash entanglement.

Aside from my invention, all the collars mentioned thus far suffer from the following disadvantages:
 (a) They cannot be adjusted to limit entanglement of the leash in the pet's legs.
 (b) They have limited means for adjusting the placement of the leash attachment.
 (c) They are difficult for people with physical disabilities to use, as they require frequent disentanglement of the pet's legs from the leash.
 (d) The collar diameter is often difficult to adjust.
 (e) They're not convertible between choke collars and standard collars.

OBJECTS AND ADVANTAGES

Accordingly, my invention is designed to limit leash entanglement, while providing for ease of use and low-cost. Since it uses basic principles of design, it is essentially trouble-free, and adaptable to any size of pet. The benefit of being able to walk a pet with very little potential for leash entanglement is its most salient advantage. In addition, it offers numerous other advantages, including:
 (a) A mechanism for adjusting the placement of the leash attachment.
 (b) Ease of use for people who have difficulty bending over or who have decreased stamina.
 (c) An easy mechanism for adjusting collar diameter.
 (d) Easy conversion between a choke collar a standard collar.

Further objects and advantages of my invention will become apparent from a consideration of the drawings and the ensuing description.

DRAWING FIGURES

REFERENCE SYMBOLS IN DRAWINGS

10 Leash Attachment
12 Collar
14 Diameter Adjuster
16 Weights
18 Clip for Pet Tags
20 Leash Attachment Slots
22 Clamp-Type Leash Attachment Adjuster
24 Clamp Pivot
26 Clamp Handle
27 Projection
28 Slide Type Leash Attachment Adjust
30 Velcro
32 Stretch Panel
34 Longitudinal Velcro Strap With Weights
36 Vertical Velcro Strap With Weight
38 Head of Fastening Pin
40 Fastening Pin
41 One-Way Spurs
42 Choke Chain
44 Length adjuster
46 Choke Collar/Chain Ring
48 Choke Collar Conversion Strap/Chain
50 Choke Collar Conversion Strap/Chain Attachment Site

DESCRIPTION—FIGS. 1 THROUGH 8

Figure 1:
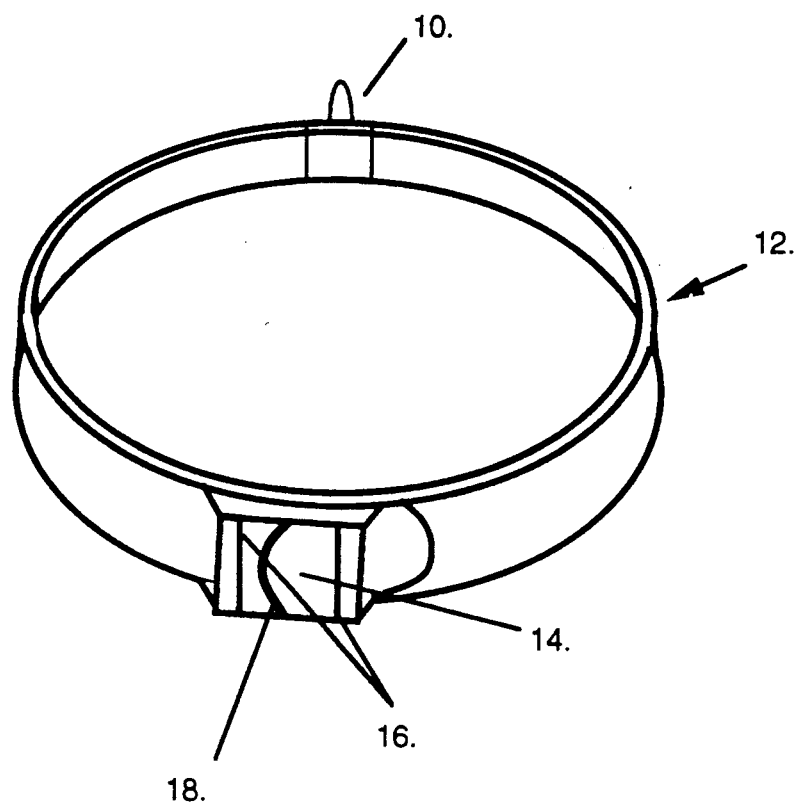
FIG. 1 shows a standard tangle limiting pet collar from the side.

A typical embodiment of the tangle limiting pet collar is illustrated in FIG. 1. It includes an adjustable leash attachment (10), diameter adjuster (14), weights (16), and a clip for pet tags (18). Please see ensuing description for details of the adjustable leash attachment.

The collar itself can be made from a variety of materials, including leather, various synthetics, and cloth. The preferred embodiment uses nylon webbing. The adjustment of the diameter of the collar can be accomplished in various ways aside from that shown. Velcro, snaps, buckles, sliders, knots, or backpack strap adjusters may be used for adjusting the diameter of the collar.

The unique feature of the tangle limiting pet collar is the weight(s) (16) on the collar, which serve as counterbalances for the weight of the leash and leash attachment (10). The weight(s) can be affixed to the diameter adjuster (14), or independent of it, but the focus of weight of the weight(s) and the diameter adjuster itself should be positioned so that it's approximately 180 degrees from the leash attachment. Ideally the weight would be an integral part of the diameter adjuster. The combined weight of the weights and/or diameter adjuster only needs to be slightly heavier than the combined weight of the leash attachment and the terminal end of the leash. As such, the diameter adjuster itself may serve as the sole counterbalancing weight, depending on the weight of the leash and leash attachment. In terms of simplicity, this would be the ideal. In order for this to work, however, either the leash attachment or the diameter adjuster must be adjustable along the perimeter of the collar. This would allow for different collar diameters, while maintaining the 180 degree spread. The diameter adjuster may also include a clip for tags (18).

Figure 2:
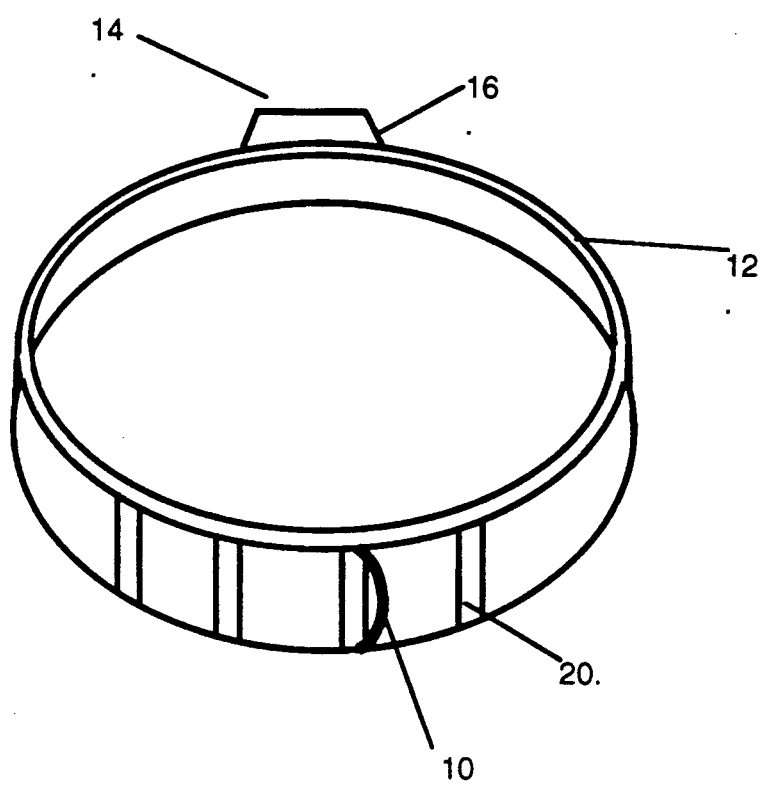
FIG. 2 shows a tangle limiting pet collar with leash attachment slots.

There are various possibilities in regard to the disposition of the various components. Adjustment of the leash attachment may take several forms. FIG. 2 shows a tangle limiting pet collar with slots which the leash attachment (10) can clip into. One may attach the leash attachment to the slots by spreading it apart, then letting it spring back into place opposite the holes for the slots on the side of the collar. The leash attachment must be made of a springy material in order for this design to work. This means of adjustment allows for a 180 degree spread between the diameter adjuster and the leash attachment.

Figure 3:
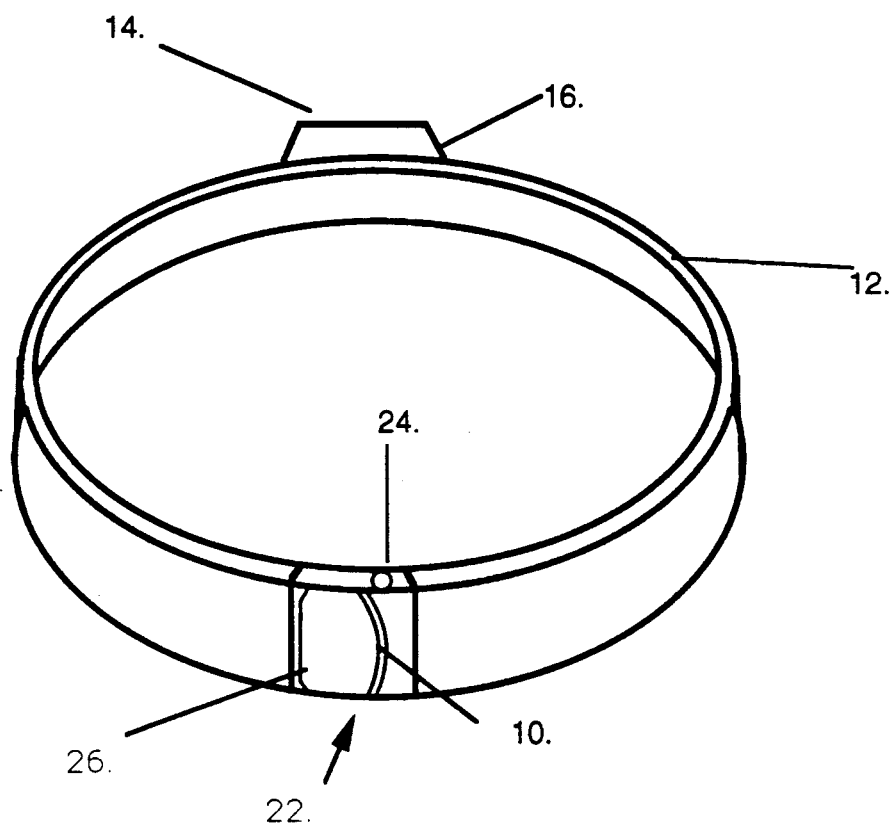
FIG. 3 shows a tangle limiting pet collar with a clamp-type leash attachment adjuster.

FIG. 3 shows a tangle limiting pet collar with a clamp-type leash attachment adjuster (22). This mechanism resembles the waist-belt adjusters on backpacks. The leash attachment (10) is incorporated into the clamp-type leash attachment adjuster, the whole mechanism being slid into proper position on the perimeter of the collar, then locked in place.

Figure 4A:
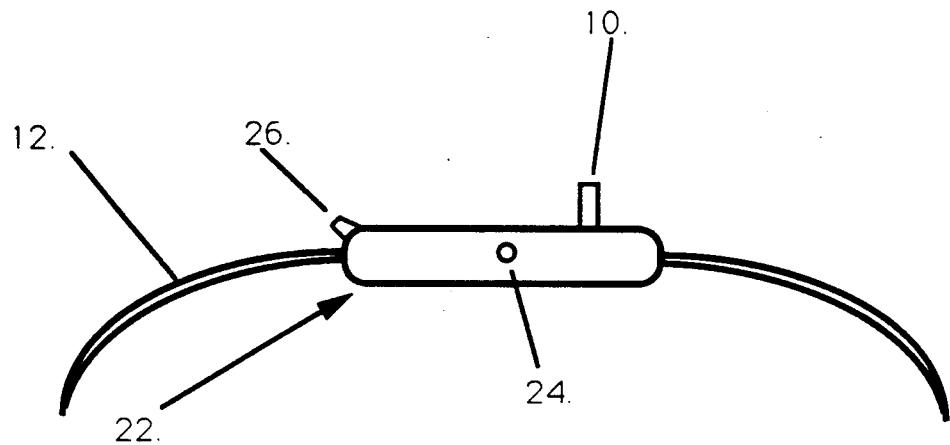
FIG. 4a shows a side view of a clamp-type leash attachment adjuster.

FIG. 4a shows a sideways view of the clamp-type leash attachment adjuster. The clamp is outlined in dots, as it would normally be obscured with a sideways view. The fulcrum of the clamp is the clamp pivot (24). The collar runs between the clamp and the inside of the clamp-type leash adjuster body. When the clamp is pushed down, the projection (27) on the clamp handle puts pressure on the collar, thus immobilizing the clamp-type leash attachment adjuster at a given point on the perimeter of the collar. The pressure is released by flipping the clamp up.

Figure 4B:
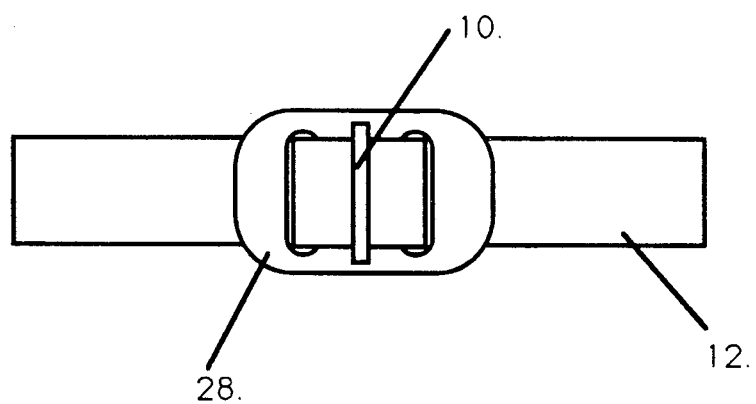
FIG. 4b shows a slide-type leash attachment adjuster.

FIG. 4b shows a slide-type leash attachment adjuster. The leash attachment (10) is integral with this, such that the whole mechanism can be adjusted by sliding it along the collar in a fashion similar to that of a backpack strap adjuster. The slide-type leash attachment adjuster works by virtue of a plurality of prolate holes in its body, which the collar runs through, and which apply friction to the collar when there is tension on it. Once it's adjusted, it stays in place due to tension on the collar itself.

Figure 6:
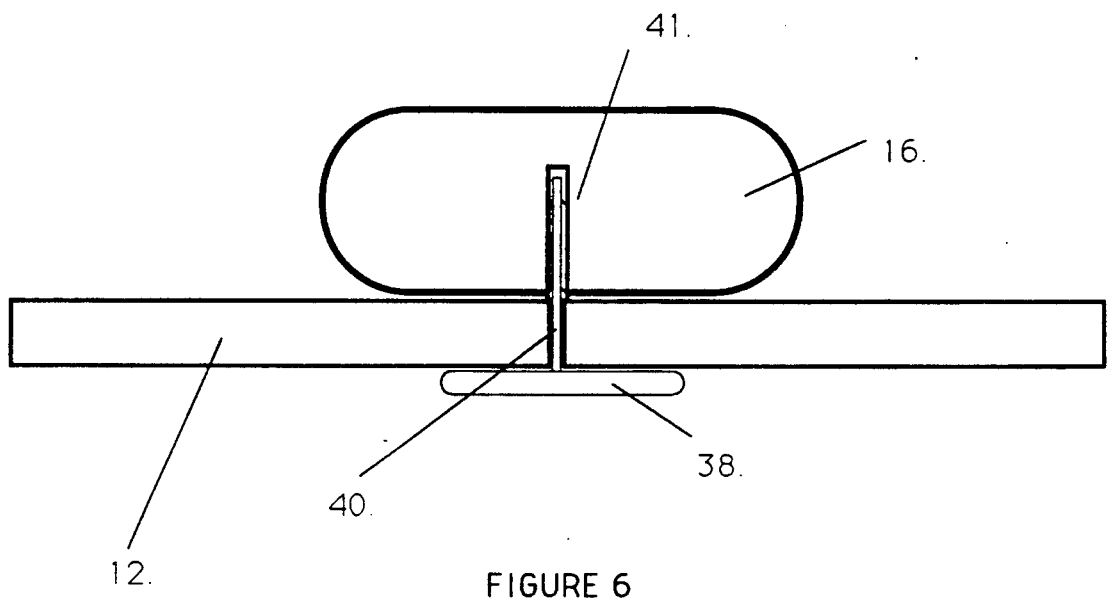
FIG. 6 shows a cross-section of a conventional collar with a weight attached via a fastening pin.
Figure 7:
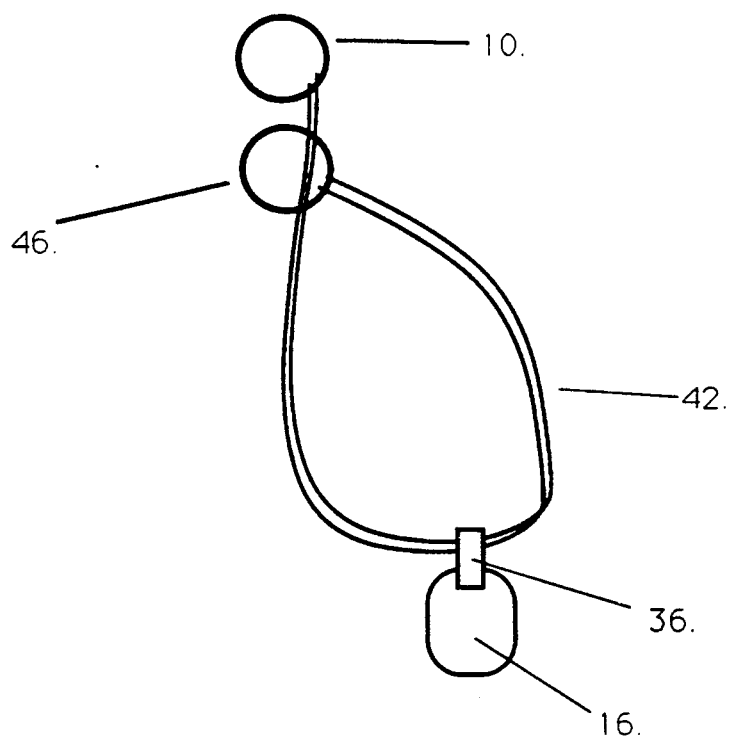
FIG. 7 shows a choke chain with a vertical strap and weight positioned 180 degrees from the leash attachment.

Thus far I've covered various designs of new tangle limiting pet collars. However, there are a variety of options for converting conventional collars into collars which perform similarly to a tangle limiting pet collar. Such options would be beneficial for those pet owners who do not wish to buy a new collar, but would like the benefits of a tangle limiting-type collar. FIGS. 5 through 7 illustrate some of these options.

Figure 5A:
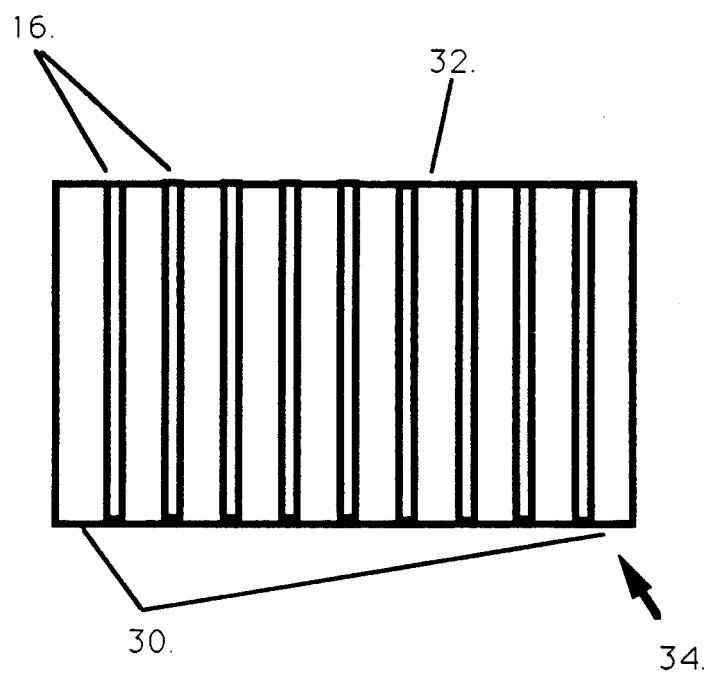
FIG. 5a shows a longitudinal velcro strap with weights.

FIG. 5a shows a longitudinal velcro strap with weights (34). This is meant to be fastened onto a conventional collar or choke collar/chain arrangement 180 degrees from the leash attachment. It incorporates a stretch panel (32) so that it fits a variety of collar widths. Velcro panels (30) on either side enable the straps to be fastened tightly, thus insuring that they won't slide out of the proper position.

Figure 5B:
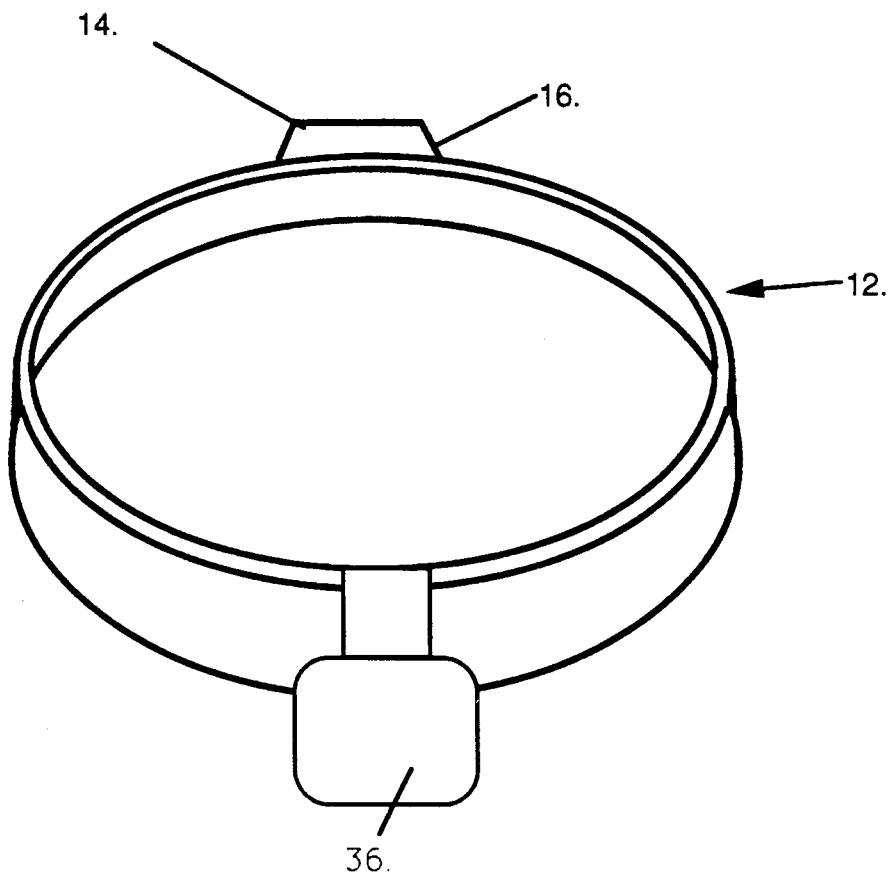
FIG. 5b shows a vertical velcro strap with a weight.

FIG. 5b shows a conventional collar with a vertical velcro strap and weight. This strap can be attached via velcro, snaps, or any other types of closure, as long as the weight remains in a position 180 degrees from the leash attachment.

FIG. 6 shows a fastening pin. The pin itself is sharp enough to pierce most collars, even leather. As such, it could be pushed through the collar in a position 180 degrees from the leash attachment. The weight can then be fastened to the pin on the outside of the collar by virtue of one-way projections (41) in the receiving part of the weight. This would allow for a permanent fixture. An alternative would be to make the weight so that the one-way projections can be inactivated by manual pressure, allowing for adjustability. This type of mechanism is found on many cufflinks and earrings.

FIG. 7 shows a choke chain with a vertical velcro strap and weight (36) attached in a position 180 degrees from the leash attachment. Such a position can be ascertained by taking the average length of the choke chain as the pet pulls on it, and dividing it in two. The weight is then placed this distance from the leash attachment.

Figure 8:
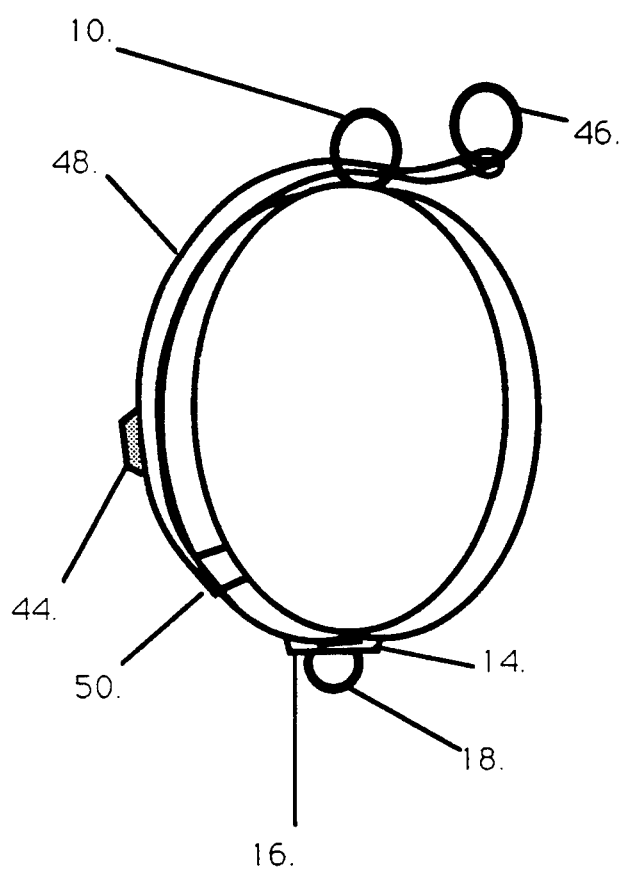
FIG. 8 shows a choke chain/collar which includes a choke collar conversion strap/chain (48), and tangle limiting capabilities.

FIG. 8 shows a choke chain/collar which includes a choke collar conversion strap/chain (48), and tangle limiting capabilities. It is basically a tangle limiting pet collar as pictured in FIG. 1. However, it includes a choke collar conversion strap/chain (48), which works the same way a conventional choke collar works, when one attaches the leash to the choke collar/chain ring (46). The choke collar conversion strap/chain may be attached to the collar on either side of the diameter adjuster (14) and/or weights (16). The end of the choke collar conversion strap/chain with the ring passes through the leash attachment(10), while being fastened on the other end to the collar via stitching, grommets, thread, or some sort of releasable attachment. Such a releasable attachment would allow one to remove the choke collar conversion strap/chain when not in use. The means of adjusting both the choke collar conversion strap/chain and the collar diameter may vary. Any of the methods mentioned previously may apply. As with the other designs, the diameter adjuster itself may act as the sole weighting means, as long as either the diameter adjuster or the leash attachment are adjustable around the perimeter. This allows for proper placement, while maintaining the adjustability needed for different sizes of pets Ideally, the tangle limiting pet collar would be sold with a specially made leash. This leash would have an attachment compatible with the tangle limiting pet collar-one which is adjustable and lightweight. Such a combination would allow for a very light counterweight and/or diameter adjuster. This is especially important for small pets.

OPERATION—FIGS. 1 THROUGH 8

The manner of using the tangle limiting pet collar is almost identical to the use of conventional collars. The primary difference is the placement of the weight(s). Regardless of which version of my invention is used, the weight should always be placed roughly 180 degrees from the leash attachment.

The convertible collar outlined in FIG. 8 is slightly different to operate. To convert it to the choke collar, one has only to connect the leash to the choke collar/chain ring (46). In order to use it as a conventional collar, one simply attaches the leash to the leash attachment (10) provided, and the choke collar/chain ring (46) hangs free. One can also attach the leash to both the choke collar/chain ring and the standard leash attachment. If a releasable attachment is used to attach the choke collar conversion strap/chain to the collar, the choke collar conversion strap/chain may be removed when not in use.

The items outlined in FIGS. 5 through 7 all use basic materials, and are designed to be adaptable to various types, sizes, and styles of collars. The longitudinal velcro strap with weights illustrated in FIG. 5a can be attached to a multitude of different collar shapes and sizes, as long as the focus of weight is 180 degrees from the leash attachment. The vertical velcro strap with weight as illustrated in FIG. 5b can be attached similarly.

Accordingly, my invention has the following advantages:

(a) A mechanism for adjusting the placement of the leash attachment.

(b) Ease of use for people who have difficulty bending over or who have decreased stamina.

(c) Easy adjustment of collar diameter.

(d) Conversion capability from conventional collars/choke chains to choke collars/chains which have tangle limiting qualities.

Although the description above contains many specificities, these should not be construed as limiting the scope of the invention, but as merely providing illustrations of some of the presently preferred embodiments of this invention. For example, the tangle limiting pet collar can be sold as either a leash/collar set, or as separate pieces. The basic configuration remains the same, but the hardware and style may vary considerably. Ideally, the tangle limiting pet collar would be sold in conjunction with a retractable-type leash, such that there would be constant mild tension on the collar, minimizing slack in the leash, thus limiting entanglement even more.

The basic configuration as illustrated in FIG. 1 is the presently preferred embodiment, although many other offshoots of those outlined are possible. They would all use a counterbalancing weight of some sort, however. Whether the weight is the diameter adjuster, or a separate weight depends on the overall design of the collar.

A choke collar (made out of a material other than chain) could be used In lieu of the choke chain illustrated in FIG. 7. Such a setup helps curtail the potential for inadvertent occlusion of the pet's airway.

The embodiments outlined in FIGS. 5a and 5b can be of various designs, as long as they remain adjustable, and easy to affix to a conventional collar. Although velcro is preferred, any sort of fastener could be used. The same goes for any of the other means of attachment outlined. Any materials may be used, as long as the counterbalancing weight principle is employed.

This configuration also has other possibilities for use. Any situation that requires the use of a collar attached to a leash or lead could benefit from the use of a tangle limiting system.

I claim:

1. A pet collar comprising a length of flexible material with a focus of weight attached to the perimeter of the collar, a means for adjusting the diameter of the collar attached to the flexible material, a leash attachment means slideable connected along the length of flexible material, a means for securing the leash attachment means to a plurality of different fixed locations around the perimeter of said collar relative to the focus of weight.

2. The pet collar of claim 1, wherein said means for securing comprises a releasable clamp.

3. The pet collar of claim 1, wherein the focus of weight is attached to the means for adjusting the diameter so the adjusting means is of greater weight than the combined weight of the leash attachment and means for securing whereby the leash attachment means has a tendency to remain on top of the animal's neck.

4. The pet collar of claim 1, further including an integral attachment means on the focus of weight to permit attachment of the focus of weight to a variety of collars.

* * * * *